United States Patent
Yoshida et al.

(10) Patent No.: US 6,209,322 B1
(45) Date of Patent: Apr. 3, 2001

(54) PRESSURIZED FLUID SUPPLY SYSTEM

(75) Inventors: Nobumi Yoshida; Hiroshi Endo; Kazuhiro Maruta; Naoki Ishizaki, all of Tochigi (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/269,925
(22) PCT Filed: Oct. 29, 1997
(86) PCT No.: PCT/JP97/03937
§ 371 Date: Apr. 2, 1999
§ 102(e) Date: Apr. 2, 1999
(87) PCT Pub. No.: WO98/21483
PCT Pub. Date: May 22, 1998

(30) Foreign Application Priority Data

Nov. 13, 1996 (JP) .................................................. 8-301712

(51) Int. Cl.$^7$ ...................................................... F16D 31/02
(52) U.S. Cl. ................................ 60/452; 60/486; 60/484
(58) Field of Search .......................... 60/384, 420, 422, 60/426, 484, 452, 445, 486

(56) References Cited

U.S. PATENT DOCUMENTS

| | | | |
|---|---|---|---|
| 3,572,460 | * | 3/1971 | Berlich ............................... 60/384 X |
| 3,964,261 | * | 6/1976 | Zukauskas ............................ 60/445 |
| 4,123,907 | * | 11/1978 | Bianchetta et al. .................... 60/445 |
| 4,237,688 | * | 12/1980 | Demmers .............................. 60/484 |
| 4,261,431 | * | 4/1981 | Hawbaker ........................... 60/484 X |
| 4,346,763 | * | 8/1982 | Swanson et al. ................... 60/484 X |
| 4,354,688 | * | 10/1982 | Swanson ............................ 60/484 X |
| 4,405,287 | * | 9/1983 | Kuchenbecker et al. .......... 60/486 X |
| 4,507,057 | * | 3/1985 | Igarashi et al. .................... 60/486 X |
| 4,649,706 | * | 3/1987 | Hutson .................................. 60/420 |
| 4,759,183 | * | 7/1988 | Kreth et al. ........................... 60/422 |
| 5,852,933 | * | 12/1998 | Schmidt .............................. 60/484 X |

FOREIGN PATENT DOCUMENTS

| | | | |
|---|---|---|---|
| 46-30813 | 10/1971 | (JP) . | |
| 48-98282 | 12/1973 | (JP) . | |
| 50-1277 | 1/1975 | (JP) . | |
| 64-364 | 1/1989 | (JP) . | |
| 256452 | * 11/1969 | (RU) | ...................................... 60/484 |
| 717416 | * 2/1980 | (RU) | ...................................... 60/420 |
| 798369 | * 1/1981 | (RU) | ...................................... 60/484 |

* cited by examiner

*Primary Examiner*—John E. Ryznic
(74) *Attorney, Agent, or Firm*—Armstrong, Westerman, Hattori, McLeland & Naughton

(57) ABSTRACT

The present invention has an object to enable to supply a discharged pressurized fluid of a hydraulic pump without any energy loss with an arbitrary flow rate distribution ratio to a plurality of actuators. A discharged pressurized fluid of the hydraulic pump 11 is supplied to the first and second actuators 15 and 16 via the first and second variable displacement type hydraulic pump/motors 13 and 14. The first variable displacement type hydraulic pump/motor 13 and the second variable displacement type hydraulic pump/motor 14 are mechanically connected to rotate at the same revolution speed. By this, the pressurized fluid is supplied to the first and second actuators 15 and 16 depending upon displacements of the first and second variable displacement type hydraulic pump/motors.

2 Claims, 9 Drawing Sheets

PRESSURIZED FLUID SUPPLY SYSTEM

TECHNICAL FIELD

The present invention relates to a pressurized fluid supply system for distributing and supplying a discharged pressurized fluid of a hydraulic pump to a plurality of actuators.

BACKGROUND ART

When a discharged pressurized fluid is supplied simultaneously to a plurality of actuators having different magnitudes of loads, the pressurized fluid is supplied only to the actuator having the minimum load and the pressurized fluid is not supplied to other actuators.

Therefore, as shown in FIG. 1, there has been known a system, in which a plurality of throttle portions, such as a first operating valve 2 and a second operating valve 3 are provided in a discharge passage 1a of a hydraulic pump 1 for simultaneously supplying a pressurized fluid to a plurality of actuators, such as a first actuator 4 and a second actuator 5 by controlling open degrees of the first and second operating valves 2 and 3 depending upon magnitudes of loads.

On the other hand, as shown in FIG. 2, there has been known a system, in which pressure compensation valves 6 are provided on the circuits connecting the first and second operating valves 2 and 3 and the first and second actuators 4 and 5 respectively, and a higher pressure between a load pressure of the first actuator 4 and a load pressure of the second actuator 5 is detected by a shuttle valve 7 to supply the detected pressure to pressure receiving portions 6a of the pressure compensation valves 6.

In the system illustrated in FIG. 2, the pressure compensation valves 6 are set for the highest load pressure. Therefore, the pressurized fluid can be supplied to the first and second actuators 4 and 5 with a flow rate distribution ratio depending upon opening degrees of the first and second operating valves 2 and 3.

In case of the foregoing pressurized fluid supply system shown in FIG. 1, if the load of the first actuator 4 is high and the load of the second actuator 5 is low when simultaneously supplying the pressurized fluid to the first actuator 4 and the second actuator 5, in order to set the pump pressure P0 of the hydraulic pump 1 at a pressure P1 of the first actuator 4 having aa higher load, the opening degree of the second operating valve 3 is reduced to lower the output pressure of the second operating valve 3 to be lower than the pump pressure P0 to be set at the pressure P2 of the second actuator 5.

Therefore, the discharged pressurized fluid of the hydraulic pump 1 causes a significant pressure loss (P0−P2) when passing through the second operating valve 3 and thus a substantial energy loss is caused. For example, a horse power loss of an engine 8 for driving the hydraulic pump 1 will be large.

On the other hand, in a system for controlling a displacement of the hydraulic pump 1 (a flow rate of the discharged fluid per one revolution) depending on the pump pressure P0 to control the horse power, for instance, a system for controlling pump pressure P0×displacement to be constant, the pressure P1 of the first actuator 4 having a high load will be the pump pressure P0 to make the displacement small and the flow rate of the discharged fluid of the hydraulic pump small. Thus, a speed of the first actuator 4 will be low.

For example, when P1=100 $kg/cm^2$ and P2=50 $kg/cm^2$, the pump pressure P0 becomes 100 $kg/cm^2$. Then, when a flow rate Q1 to the first actuator 4 is 1 and a flow rate Q2 to the second actuator 5 is 2, a displacement Q1+Q2 of the hydraulic pump 1 becomes 3. Therefore, when pump pressure P0×displacement is controlled to be constant, 100 $kg/cm^2$×3 is constant. Thus, the higher the pump pressure P0 becomes, the smaller the displacement becomes.

On the other hand, in the pressurized fluid supply system, as shown in FIG. 2, set fort above, the discharged pressure fluid of the hydraulic pump 1 causes a pressure loss by passing through the operating valve and the pressure compensation valve to cause a significant energy loss to make it impossible to effectively use the discharged pressurized fluid of the hydraulic pump 1.

Therefore, the present invention has an object to provide a pressurized fluid supply system which can solve the problem set forth above.

DISCLOSURE OF THE INVENTION

The first invention is a pressurized fluid supply system mechanically connecting a plurality of variable displacement type hydraulic pump/motors to rotate at the same revolution speed and to supply a discharged pressurized fluid of a hydraulic pump 11 to actuators through the respective variable displacement type hydraulic pump/motors.

According to the first invention, a flow rate ratio to be supplied to a plurality of actuators is a displacement ratio between the variable displacement type hydraulic pump/motors irrespective of loads of the actuators.

Therefore, by varying the displacements of a plurality of variable displacement type hydraulic pump/motors, the discharged pressurized fluid of the hydraulic pump can be supplied to a plurality of actuators with an arbitrary flow rate distribution ratio. Furthermore, for a reduction of the pressure loss, the energy loss becomes smaller.

Further, since the discharged pressure (pump pressure) of the hydraulic pump becomes an average value of load pressures of a plurality of actuators, the displacement of the hydraulic pump becomes greater to make the speed of the actuator high, in case of a horse power control system controlling the displacement of the hydraulic pump depending upon the pump pressure.

The second invention is a pressurized fluid supply system providing a variable displacement type hydraulic pump/motor and an operating valve in each circuit connecting a discharge passage 12 of a hydraulic pump 11 and each of a plurality of actuators, and mechanically connecting the variable displacement type hydraulic pump/motors to rotate at the same revolution speed, and providing displacement control means for adjusting displacements of the variable displacement type hydraulic pump/motors at values inversely proportional to a pressure ratio between the actuators each connected to the corresponding variable displacement type hydraulic pump/motor.

According to the second invention, since the displacements of the variable displacement type hydraulic pump/motors can be controlled automatically depending upon the pressure ratio between the actuators, the operation will be simple.

The third invention is a pressurized fluid supply system providing a variable displacement type hydraulic pump/motor and an operating valve in each circuit connecting a discharge passage 12 of a hydraulic pump 11 and each of a plurality of actuators, and mechanically connecting the variable displacement type hydraulic pump/motors to rotate at the same revolution speed, and providing means for detecting an open degree of each of the operating valves respectively and displacement control means for adjusting displacements of the variable displacement type hydraulic pump/motors at values each corresponding to the open degree of the operating valve connected to the corresponding variable displacement type hydraulic pump/motor.

According to the third invention, the displacement of each variable displacement type hydraulic pump/motor becomes a value depending upon open the degree of each operating valve. Therefore, the discharged pressurized fluid of the hydraulic pump/motors can be supplied to the plurality of actuators depending upon open degrees of the operating valves irrespective of the load pressures.

On the other hand, since the discharged pressurized fluid of the hydraulic pump causes little pressure loss when passing through the variable displacement type hydraulic pump/motor, energy loss is small to permit an effective use of the discharged pressurized fluid of the hydraulic pump.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for an explanation and an understanding only.

In the drawings.

BEST MODE FOR IMPLEMENTING THE INVENTION

The preferred embodiment of a pressurized fluid supply system according to the present invention will be discussed hereinafter with reference to the accompanying drawings.

Figure 1:
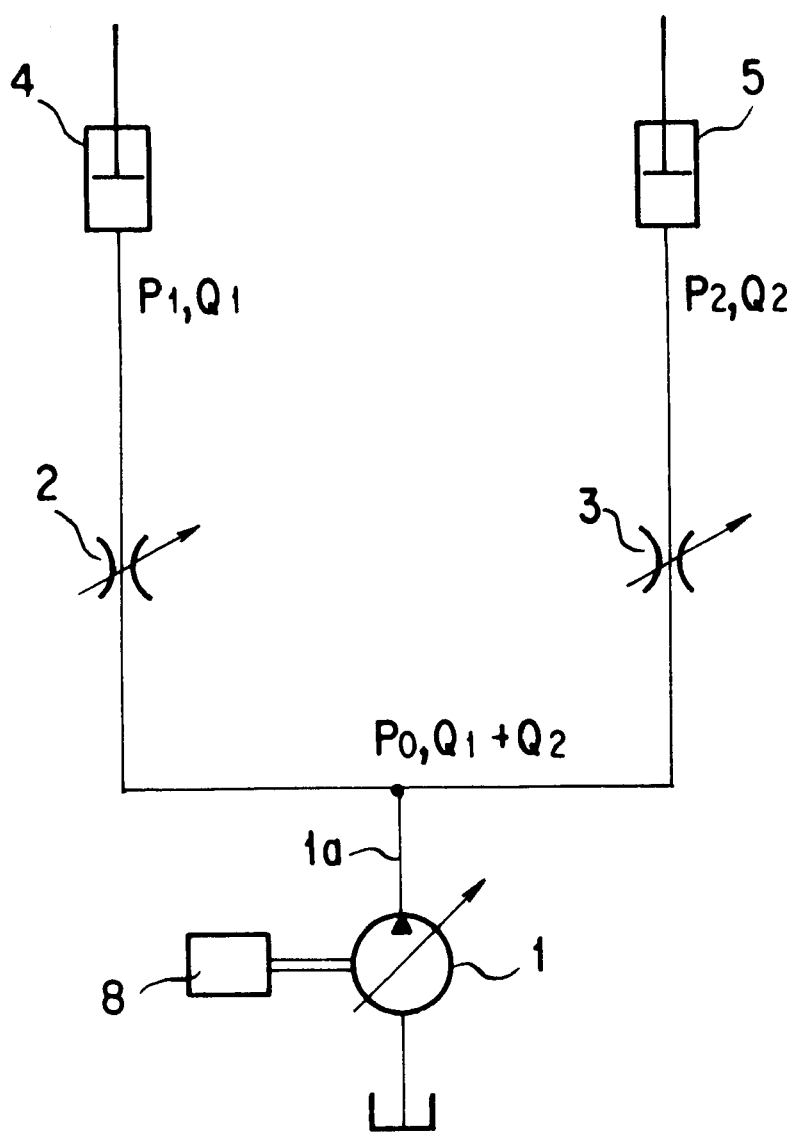
FIG. 1 is a hydraulic circuit diagram showing the first prior art.
Figure 2:
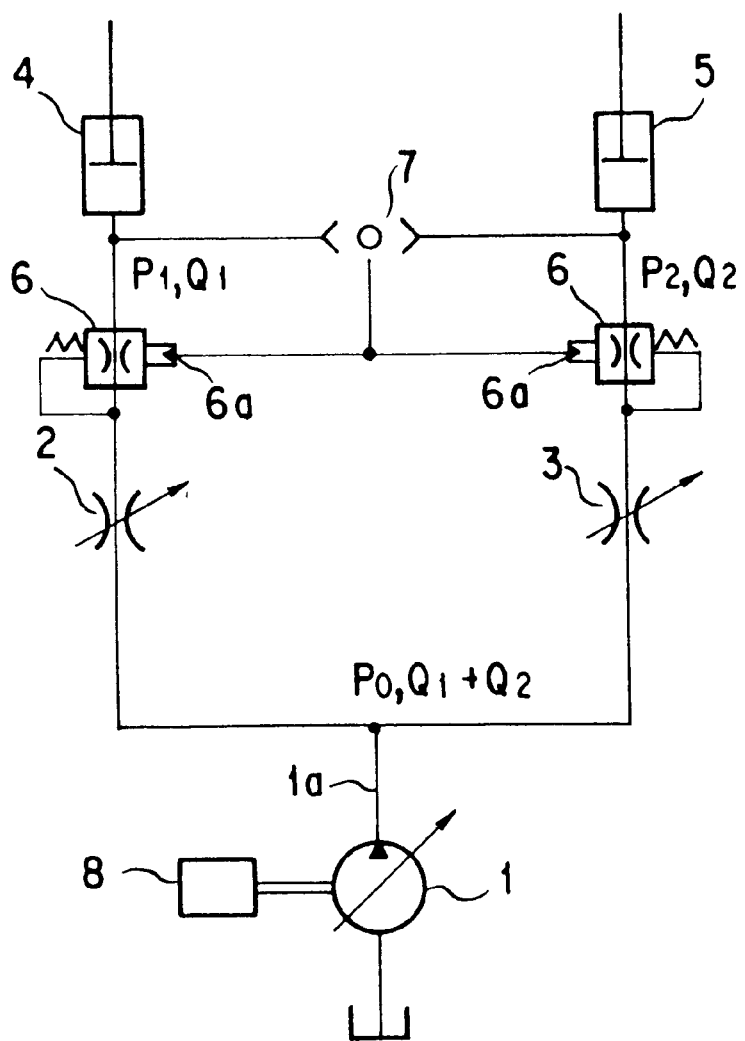
FIG. 2 is a hydraulic circuit diagram showing the second prior art.
Figure 3:
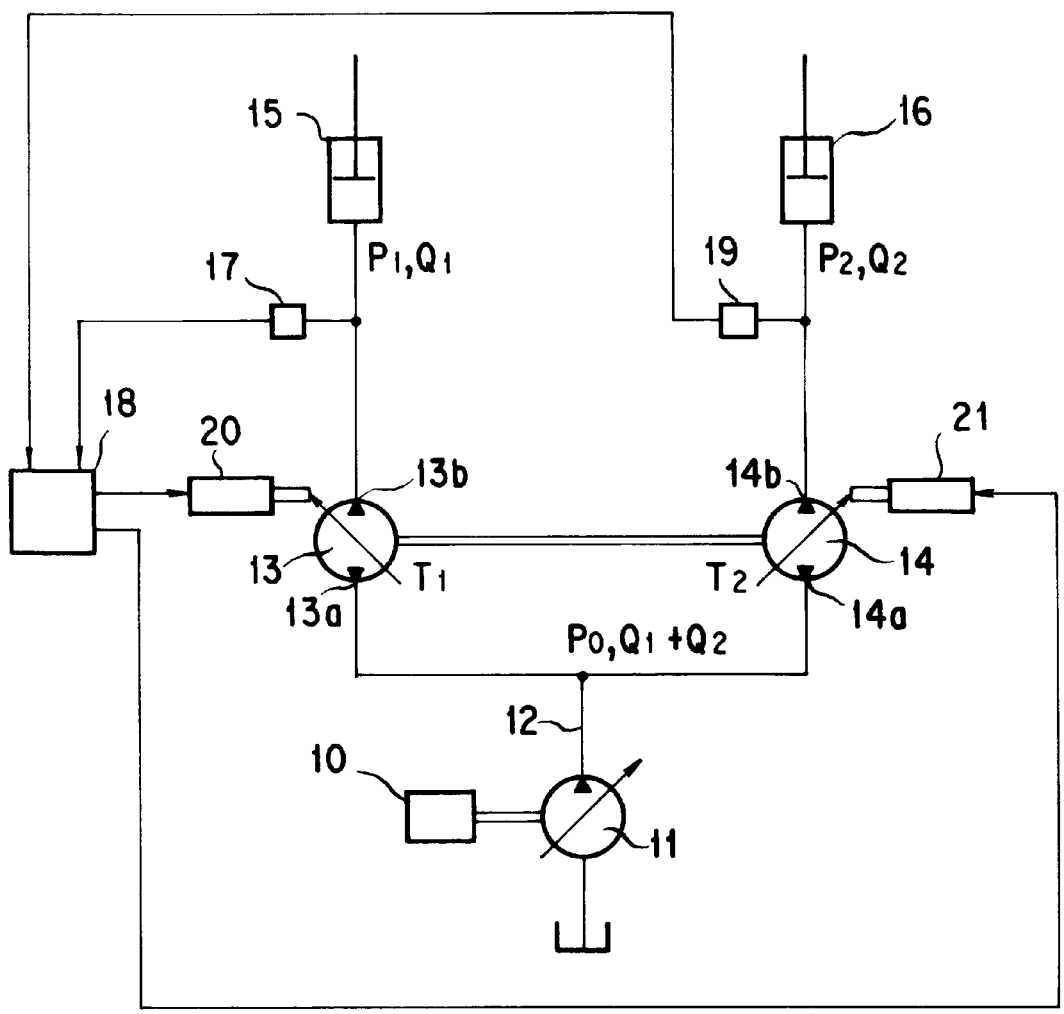
FIG. 3 is a hydraulic circuit diagram showing the first embodiment of the present invention.

As shown in FIG. 3, a discharge passage 12 of a hydraulic pump 11 which is driven by an engine 10 is connected to first ports 13a and 14a of a plurality of variable displacement type hydraulic pump/motors, such as a first variable displacement type hydraulic pump/motor 13 and a second variable displacement type hydraulic pump/motor 14. The first variable displacement type hydraulic pump/motor 13 and the second variable displacement type pump/motor 14 are mechanically connected to each other to be driven at the same revolution speed.

A second port 13b of the first variable displacement type hydraulic pump/motor 13 is connected to a first actuator 15.

A second port 14b of the second variable displacement type hydraulic pump/motor 14 is connected to a second actuator 16.

The pressure P1 of the first actuator 15 is detected by a first pressure sensor 17 and input to a controller 18. The pressure P2 of the second actuator 16 is detected by a second pressure sensor 19 and input to the controller 18. The controller 18 outputs a displacement control signal to a first displacement control member 20 and a second displacement control member 21 to control a displacement of the first variable displacement type hydraulic pump/motor 13 and a displacement of the second variable displacement type hydraulic pump/motor 14, respectively.

Particularly, a ratio between the displacement of the first variable displacement type hydraulic pump/motor 13 and the displacement of the second variable displacement type hydraulic pump/motor 14 is set at a value inversely proportional to a ratio between the pressure P1 of the first actuator 15 and the pressure P2 of the second actuator 16.

Next, operation will be discussed.

When the load of the first actuator 15 is high, for example, the pressure P1 is 100 kg/cm$^2$ and the load of the actuator 16 is low, for example, the pressure P2 is 50 kg/cm$^2$, the displacement of the first variable displacement type hydraulic motor 13 is assumed to be 1 and the displacement of the second variable displacement type hydraulic motor 14 is assumed to be 2.

By this, the flow rate Q1 to the first actuator 15 becomes 1 and the flow rate Q2 to the second actuator 16 becomes 2. Then, the displacement of the hydraulic pump 11 becomes Q1+Q2.

By this, the first variable displacement type hydraulic pump/motor 13 acts as a pump to pressurize the pressurized fluid of the first port 13a to be discharged to the second port 13b. The pump pressure P0 becomes lower than the pressure P1 of the first actuator 15 but higher than the pressure P2 of the second actuator 16, in a particular case, (100 kg/cm$^2$×1+50 kg/cm$^2$×2)×⅓, which is about 66 kg/cm$^2$.

Accordingly, in case of the system performing a horse power control to control the displacement of the hydraulic pump 11 so that pump pressure P0×displacement is constant, the pump pressure P0 becomes a pressure (about 66 kg/cm$^2$) lower than the pressure P1 (100 kg/cm$^2$) of the first actuator 15 having a high load. Therefore, the displacement of the hydraulic pump 11 becomes greater than that in the prior art to the extent of 100/66 to make it possible to drive the actuator swiftly.

Next, the second embodiment of the present invention will be discussed.

Figure 4:
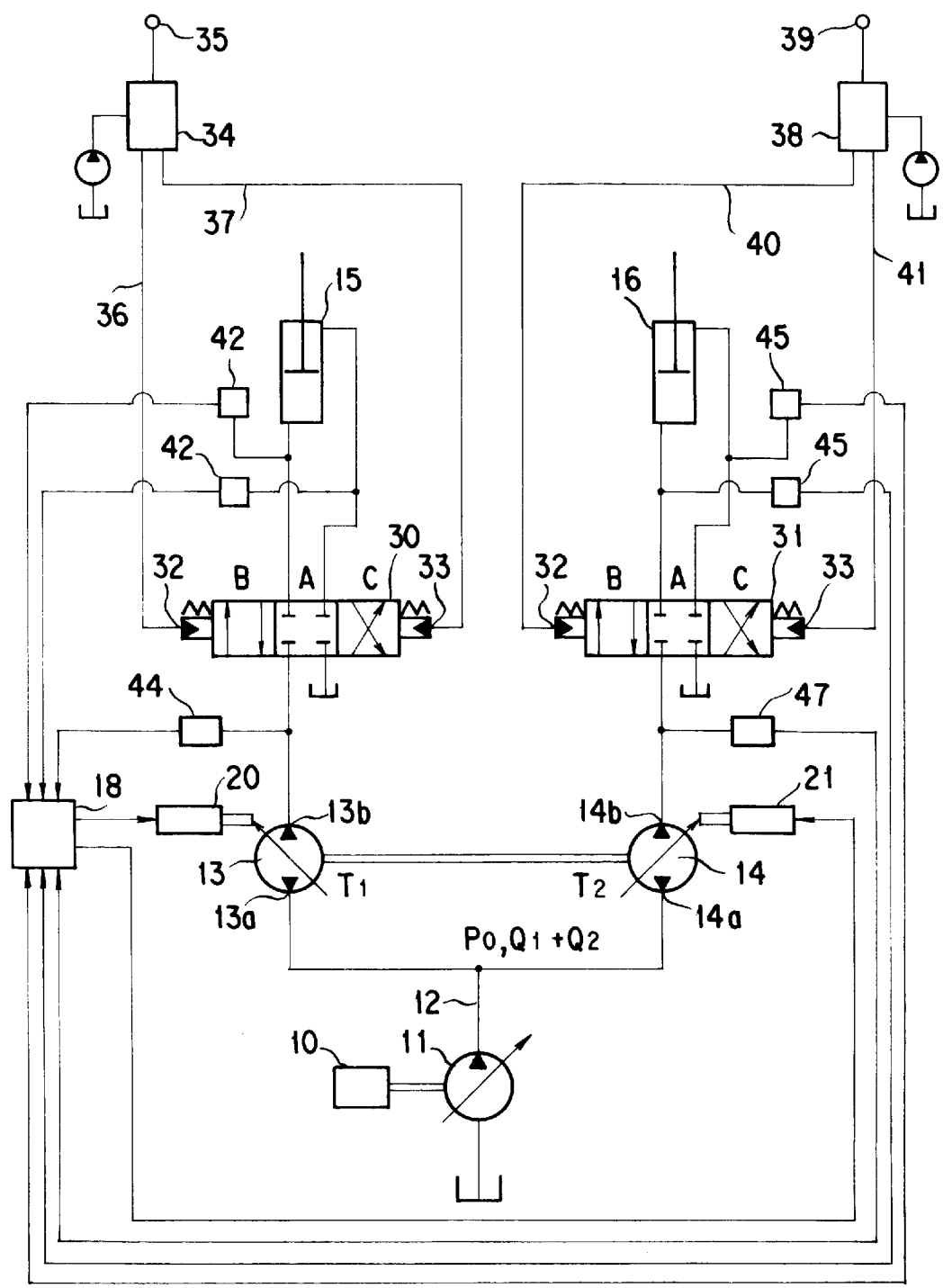
FIG. 4 is a hydraulic circuit diagram showing the second embodiment of the present invention.

As shown in FIG. 4, a first operating valve 30 which supplies a pressurized fluid to the first actuator 15, and a second operating valve 31 which supplies a pressurized fluid to the second actuator 16, are provided. The first and second operating valves 30 and 31 are held at a neutral position A by springs, and are shifted to a first position B when a pilot pressure is supplied to a first pressure receiving portion 32, and shifted to a second position C when a pilot pressure is supplied to a second pressure receiving portion 33.

When a lever 35 is operated in one direction, a first hydraulic pilot valve 34 outputs a pilot pressure proportional to its operation stroke to a first circuit 36, and when the lever 35 is operated in the other direction, the first hydraulic pilot valve 34 outputs the pilot pressure proportional to its operation stroke to a second circuit 37. The first circuit 36 is connected to the first pressure receiving portion 32 of the first operating valve 30 and the second circuit 37 is connected to the second pressure receiving portion 33.

By this, the first operating valve 30 is selectively shifted toward the first position B and the second position C in proportion to the operation stroke of the lever 35.

When a lever 39 is operated in one direction, a second hydraulic pilot valve 38 outputs a pilot pressure proportional to operation stroke to a first circuit 40, and when the lever 39 is operated in the other direction, the second hydraulic pilot valve 38 outputs the pilot pressure proportional to operation stroke to a second circuit 41. The first circuit 40 is connected to the first pressure receiving portion 32 of the second operating valve 31 and the second circuit 41 is connected to the second pressure receiving portion 33 of the second operating valve 31.

By this, the second operating valve 31 is selectively shifted toward the first position B and the second position C in proportion to the operation stroke of the lever 39.

In a circuit connecting the first operating valve 30 and the first actuator 15, an operating valve outlet side pressure sensor 42 is provided. In a circuit connected to an inlet side of the first operating valve 30, an operating valve inlet side pressure sensor 44 is provided.

In a circuit connecting the second operating valve 31 and the second actuator 16, an operating valve outlet side pressure sensor 45 is provided. In a circuit connected to an inlet side of the second operating valve 31, an operating valve inlet side pressure sensor 47 is provided.

Detected pressures by the respective pressure sensors are input to the controller 18, respectively. Then, each differential pressure between the inlet side pressure and the outlet side pressure of the first and second operating valves 30 and 31 is calculated. On the basis of the differential pressures, the control signals are output to the first and second displacement control members 20 and 21, respectively, to adjust the displacement ratio between the first and second variable displacement type hydraulic pump/motors 13 and 14 inversely proportional to a ratio of the differential pressures.

In a particular case, each differential pressure between the inlet side pressure and the outlet side pressure of the first and second operating valves 30 and 31 is inversely proportional to each of the shifting distances of them toward the first position B or the second position C from the neutral position A. Therefore, on the basis of the differential pressures, the controller 18 calculates the shifting distances of the first and second operating valves 30 and 31, respectively.

Then, between the first and second variable displacement type hydraulic pumps 13 and 14, one having a greater shifting distance is provided with a greater displacement, and one having a smaller shifting distance is provided with a smaller displacement.

Thus, the pressurized fluid can be supplied to the first and second actuators 15 and 16 with a flow rate distribution ratio depending upon the shifting distance (open degree) of the first operating valve 30 and the switching stroke (open degree) of the second operating valve 31. In this case, it is detected to which side of chamber of the first and second actuators 15 and 16, the pressurized fluid is supplied, on the basis of the operating directions of the levers 35 and 39 or the presence and absence of the pilot pressures in the first and second circuits or so forth, and then a signal indicating such the condition is put into the controller 18 for selecting the detected pressure by one of the pressure sensors 42 and 45.

Figure 5:
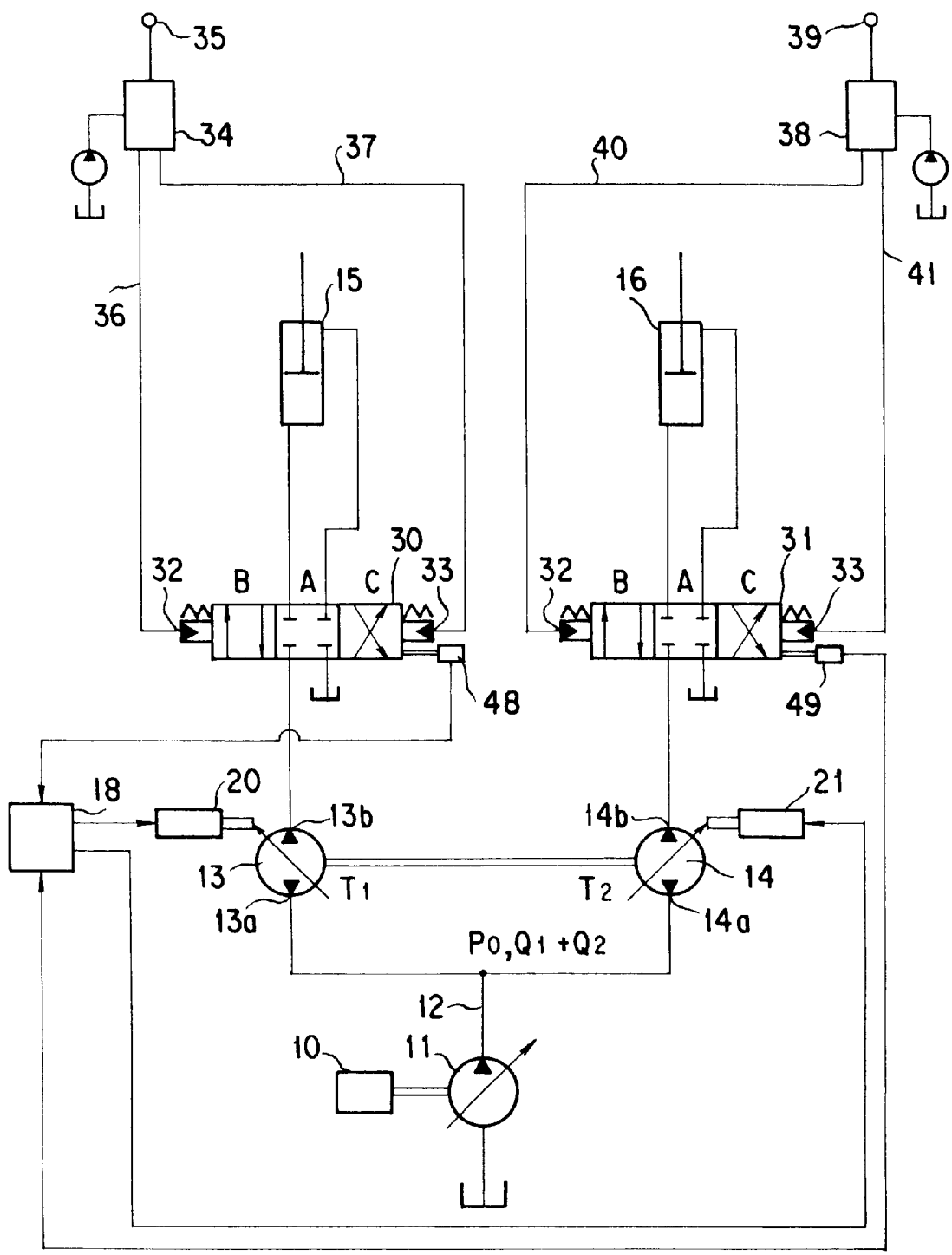
FIG. 5 is a hydraulic circuit diagram showing the third embodiment of the present invention.

FIG. 5 shows the third embodiment of the present invention. First and second shifting distances detection sensors 48 and 49 detecting switching strokes of the first and second operating valves 30 and 31 are provided, respectively. On the basis of the shifting distances detected by the first and second shifting distance detection sensors 48 and 49, the controller 18 calculates open degrees of the first and second operating valves 30 and 31, and controls the displacements of the first and second variable displacement type hydraulic pump/motors 13 and 14 on the basis thereof in the manner similar to the above.

Figure 6:
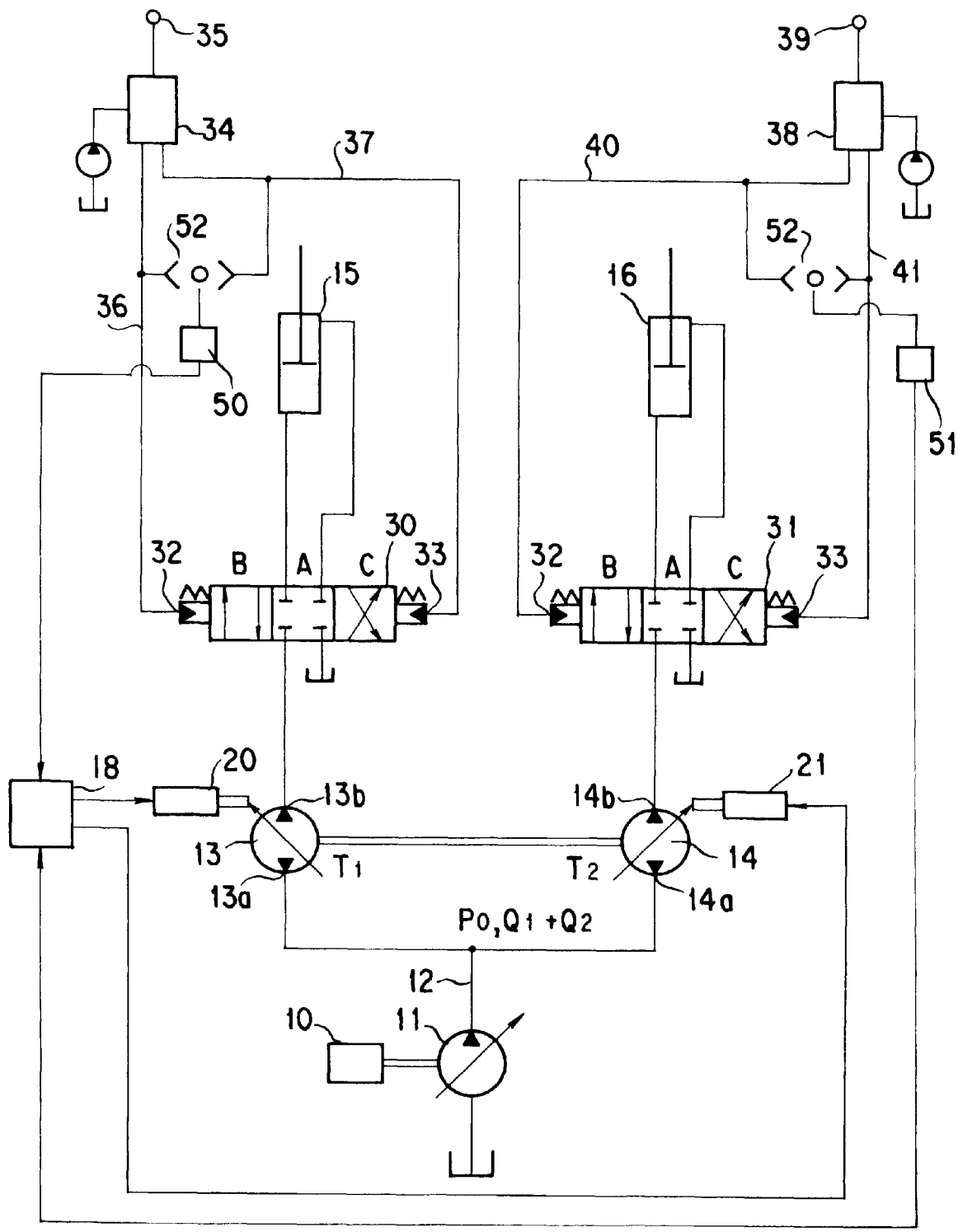
FIG. 6 is a hydraulic circuit diagram showing the fourth embodiment of the present invention.

FIG. 6 shows the fourth embodiment of the present invention, in which first and second pressure detecting sensors 50 and 51 detecting the pilot pressures are connected to the first and second circuits 36 and 37 of the first hydraulic pilot valve 34 and the first and second circuits 40 and 41 of the second hydraulic valve 38 via shuttle valves 52, respectively. The pressures of the first and second pressure detecting sensors 50 and 51 are fed to the controller 18 so that open degrees of the first and second operating valves 30 and 31 may be calculated by the controller 18.

The controller 18 controls the displacements of the first and second variable displacement type hydraulic pump/motors 13 and 14 depending upon calculated open degrees of the first and second operating valves 30 and 31, in a manner similar to that set forth above.

Figure 7:
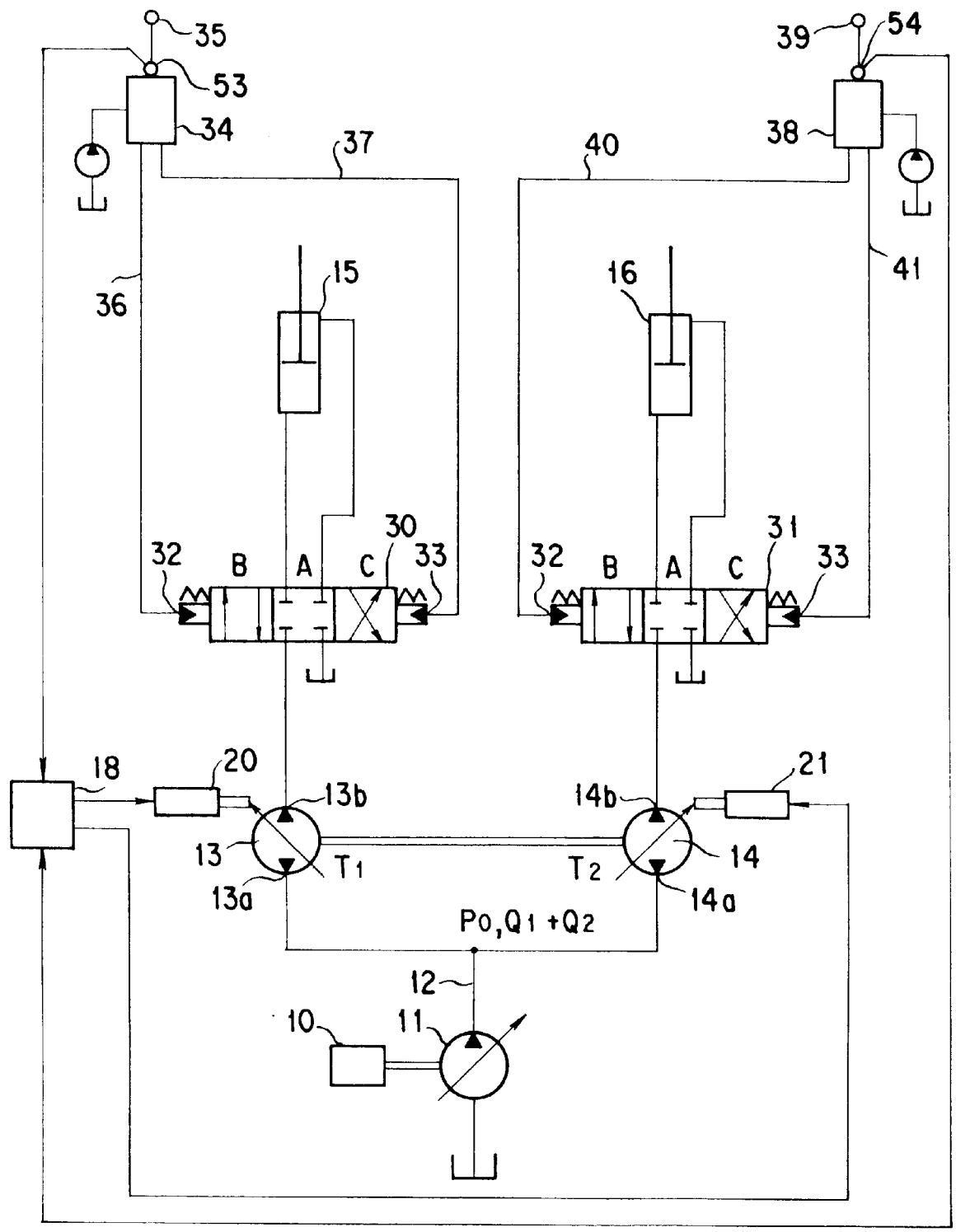
FIG. 7 is a hydraulic circuit diagram showing the fifth embodiment of the present invention.

FIG. 7 shows the fifth embodiment of the present invention, in which a first stroke sensor 53 for detecting an operating stroke of lever 35 for the first hydraulic pilot valve 34 and a second stroke sensor 54 for detecting an operating stroke of the lever 39 for the second hydraulic pilot valve 38 are provided. The operating strokes detected by the first and second stroke sensors 53 and 54 are input to the controller 18 so that the open degrees of the first and second operating valves 30 and 31 are calculated by the controller 18.

The controller 18 controls the displacements of the first and second variable displacement type hydraulic pump/motors 13 and 14 depending upon calculated open degrees of the first and second operating valves 30 and 31, in a manner similar to that set forth above.

While the respective foregoing embodiments have been discussed in the case where the hydraulic pump 11 is one, it is possible to employ a plurality of hydraulic pumps. And it is also possible to connect more than or equal to three variable displacement type hydraulic pump/motors.

Next, the sixth embodiment of the present invention will be discussed.

Figure 8:
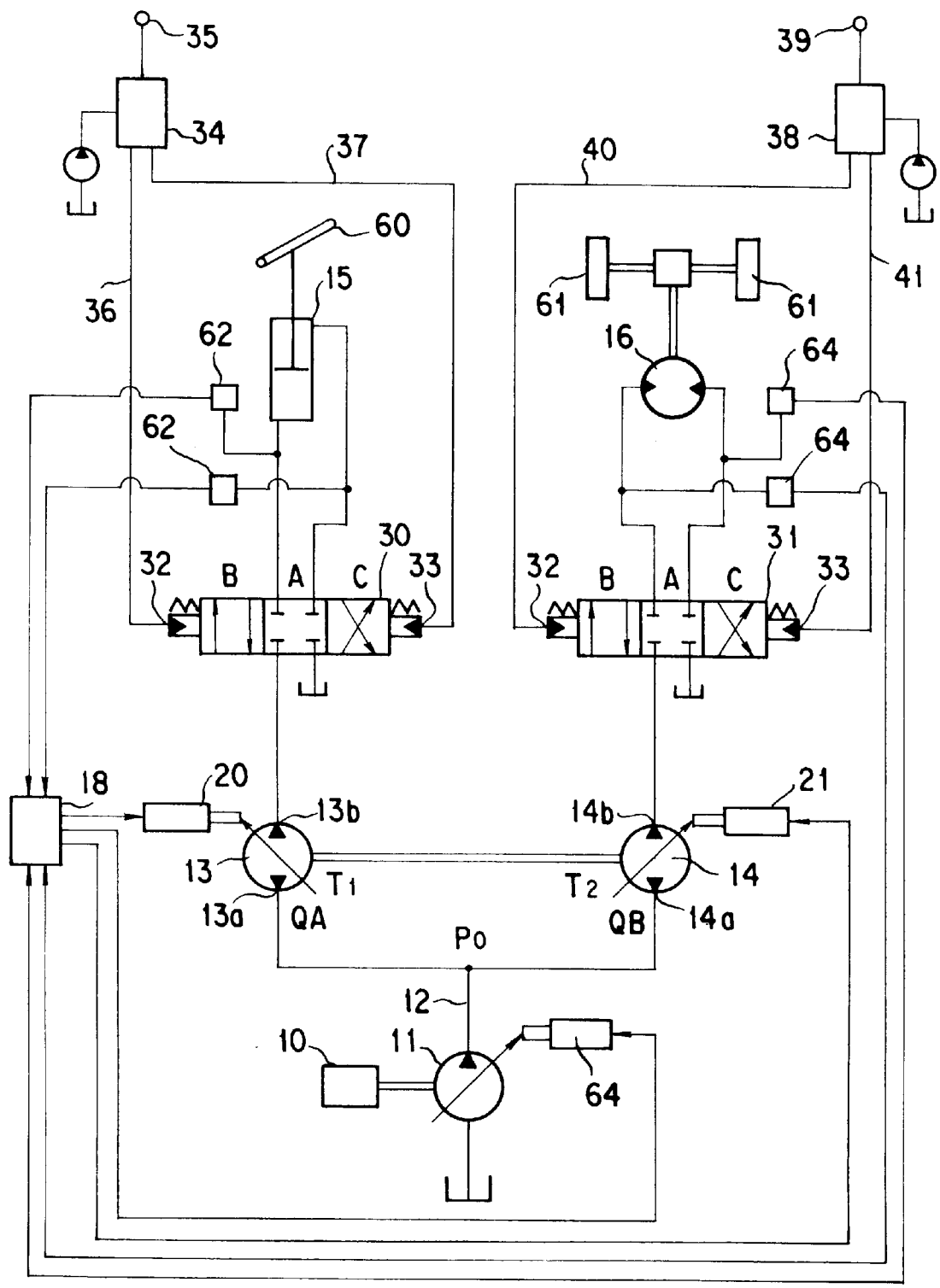
FIG. 8 is a hydraulic circuit diagram showing the sixth embodiment of the present invention.

As shown in FIG. 8, the first actuator 15 is a working machine cylinder for vertically rocking a boom 60 of a power shovel, and the second actuator 16 is a traveling hydraulic motor for driving left and right traveling driving wheels 61 of the power shovel.

A first load pressure sensor 62 for detecting a load pressure of the first actuator 15 is provided. A second load pressure sensor 64 for detecting a load pressure of the second actuator 16 is provided. The load pressures detected by the first and second load pressure sensors 62 and 64 are input to the controller 18.

The controller 18 controls displacements of the first and second variable displacement type hydraulic pump/motors 13 and 14 on the basis of the load pressures $P_A$ and $P_B$ detected by the first and second load pressure sensors 62 and 64 to establish $P_A \times Q_A + P_B \times Q_B = (Q_A + Q_B) \times P_0$. It should be noted that $Q_A$ is a displacement of the first variable displacement type hydraulic pump/motor 13, $Q_B$ is a displacement of the second variable displacement type hydraulic pump/motor 14, and $P_0$ is a hydraulic pump discharge pressure.

Since the discharge pressure $P_0$ of the hydraulic pump 11 becomes a middle pressure between the load pressures $P_A$ and $P_B$, the fluid can flow at correspondingly increased flow rate. As a result, the fluid can flow through the actuator in a greater flow rate.

As set forth above, the working machine can be operated with a traveling of the vehicle having such a working machine. Also, upon a sole operating of the working machine or a sole traveling of the vehicle, full amount of the discharged pressurized fluid of the hydraulic pump 11 is supplied to the working machine cylinder or the traveling hydraulic motor to perform a high speed work or a high speed travel. Even in this case, in a manner similar to that in the second embodiment, one of the load pressure sensors 62 and 64 is selected.

Next, the seventh embodiment of the present invention will be discussed.

Figure 9:
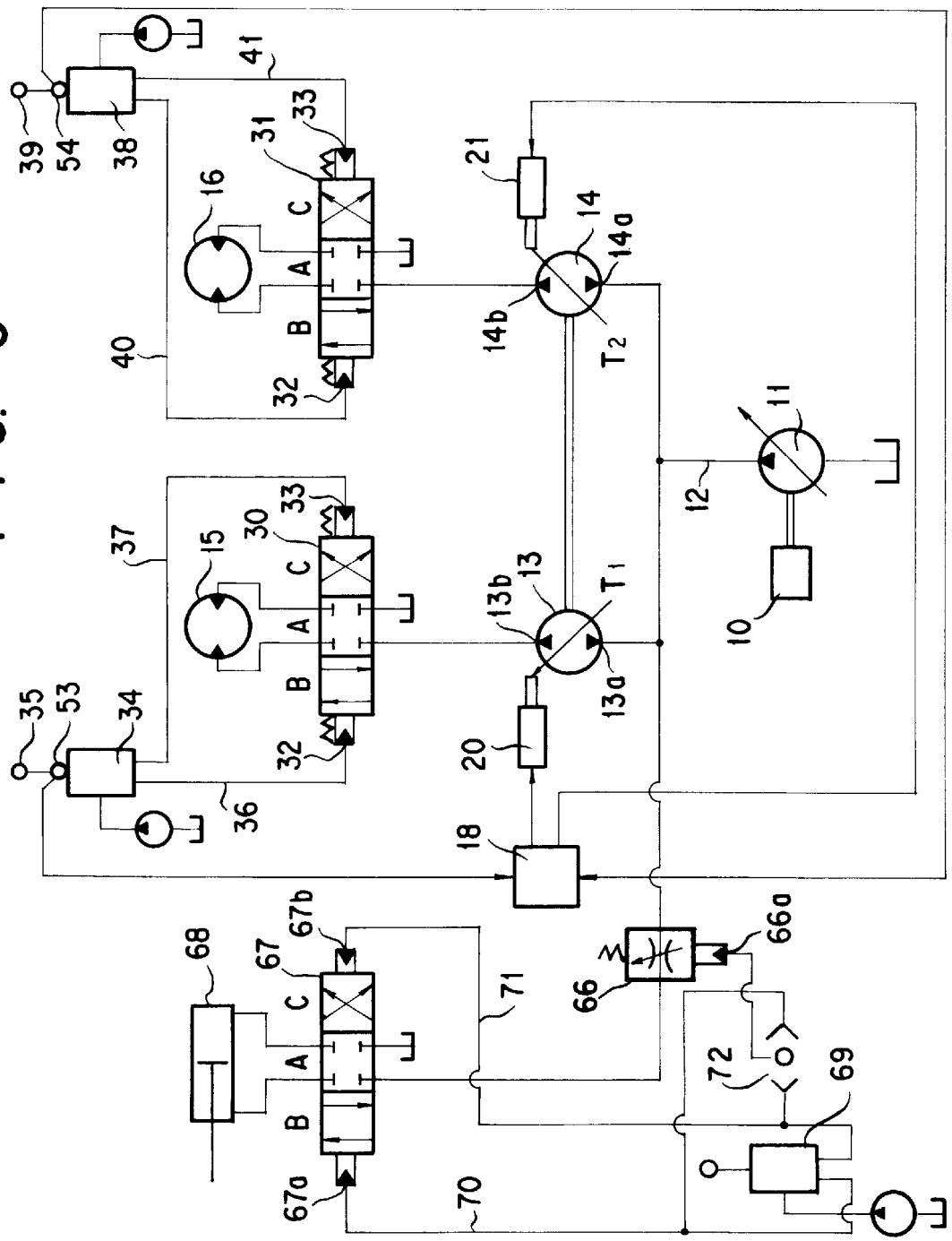
FIG. 9 is a hydraulic circuit diagram showing the seventh embodiment of the present invention.

As shown in FIG. 9, the first actuator 15 is a left traveling hydraulic motor, and the second actuator 16 is a right traveling hydraulic motor. The discharge passage 12 of the hydraulic pump 11 is connected to an operating valve 67 for the working machine via a flow rate control valve 66 with a pressure compensation. The operating valve 67 for the working machine supplies the pressurized fluid to a cylinder 68 for the working machine.

To first and second pressure receiving portions 67a and 67b of the operating valve 67 for the working machine, a first circuit 70 and a second circuit 71 of a hydraulic pilot valve 69 for the working machine are connected, respectively. By operating the hydraulic pilot valve 69, the operating valve is switched to a neutral position A, the first position B and the second position C are switched. The pressurized fluid in the higher pressure side of the first circuit 70 and the second circuit 71 is supplied to the pressure receiving portion 66a of the flow rate control valve 66 by the shuttle valve 72.

In the first and second hydraulic pilot valves 34 and 38, in a manner similar to that in the fifth embodiment set forth above, the first and second stroke sensors 53 and 54 are provided. Detected strokes by these first and second stroke sensors 53 and 54 are input to the controller 18. Then, in a manner similar to those set forth above, the displacements of the first and second variable displacement type hydraulic pump/motors 13 and 14 are controlled depending upon open degrees of the first and second operating valves 30 and 31.

As set forth above, when the levers 35 and 39 of the first and second hydraulic pilot valves 34 and 38 are operated in the same direction and at the same stroke, the open degrees of the first and second operating valves 30 and 31 are the same, and the displacements of the first and second variable displacement type hydraulic pump/motors 13 and 14 become the same. By this, the first and second actuators 15 and 16 (left and right traveling hydraulic motors) are driven at the same revolution speed while revolution resistances are different. Therefore, the vehicle can travel in straight.

On the other hand, when the levers 35 and 39 of the first and second hydraulic pilot valves 34 and 38 are operated at mutually different strokes, the displacement of the variable displacement type pump/motor corresponding to the lever operated at a greater stroke than the other becomes large to make the open degree of the operation valve large. Thus, the actuator (the traveling hydraulic motor) corresponding to the lever operated at a greater operation stroke is driven at a higher revolution speed than the other to enable a turning travel of the vehicle.

Further, when the hydraulic pilot valve 69 for the working machine is operated, since the operating valve 67 for the working machine is switched and the pressurized fluid acts on the pressure receiving portion 66a of the flow rate control valve 66, the discharged pressurized fluid of the hydraulic pump 11 is supplied to the cylinder 68 for the working machine.

As set forth above, without using a compensation valve for straight traveling which has been employed conventionally, a straight traveling and a turning traveling can be performed. On the other hand, when the displacement of the hydraulic pump 11 is controlled depending on the pump pressure with maintaining the horse power constant, the pump pressure becomes an average value of the pressures of the first and second actuators 15 and 16. Therefore, discharge amount of the hydraulic pump becomes greater to permit a turning travel of the vehicle in good condition.

What is claimed is:

1. A pressurized fluid supply system, comprising:

a hydraulic pump;

a plurality of variable displacement type hydraulic pump/motors both connected to a discharge passage of said hydraulic pump, said hydraulic pump/motors being mechanically connected to each other to rotate at the same revolution speed;

a plurality of operating valves connected to said variable displacement type hydraulic pump/motors, respectively;

a plurality of actuators connected to said operating valves, respectively; and a displacement control means for adjusting a ratio between the displacements of said variable displacement type hydraulic pump/motors at a value in inverse proportion to a pressure ratio between said actuators each connected to the corresponding variable displacement type hydraulic pump/motor.

2. A pressurized fluid supply system, comprising:

a hydraulic pump;

a plurality of variable displacement type hydraulic pump/motors both connected to a discharge passage of said hydraulic pump, said hydraulic pump/motors being mechanically connected to each other to rotate at the same revolution speed;

a plurality of operating valves connected to said variable displacement type hydraulic pump/motors, respectively;

a plurality of actuators connected to said operating valves, respectively;

means for detecting open degrees of said operating valves; and a displacement control means for adjusting a ratio between the displacements of said variable displacement type hydraulic pump/motors at a value in proportion to a ratio between open degrees of said operating valves each connected to the corresponding variable displacement type hydraulic pump/motors.

\* \* \* \* \*